3,068,090
ALKALI METAL SALTS AND BASE ADDITIONS IN NON-TITANIFEROUS ORE REDUCTIONS

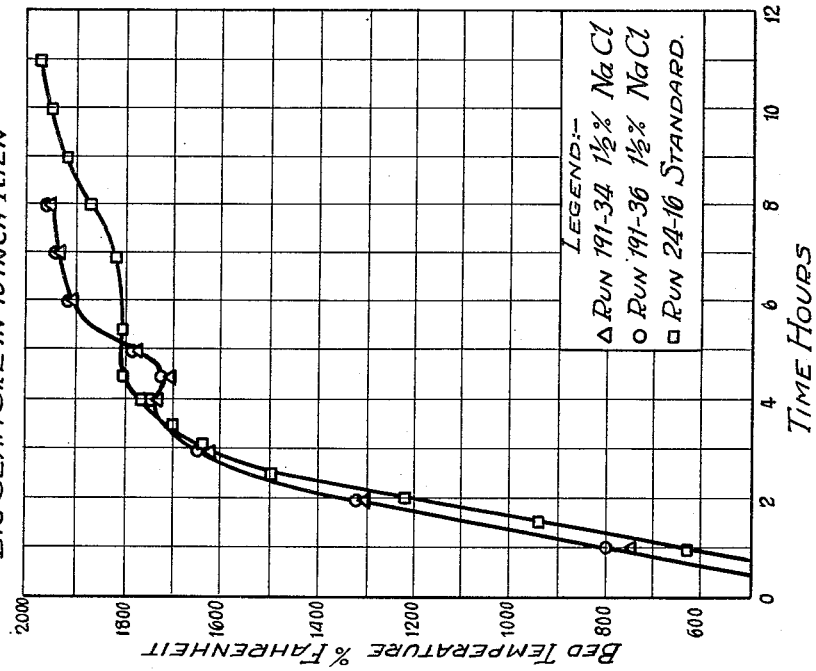
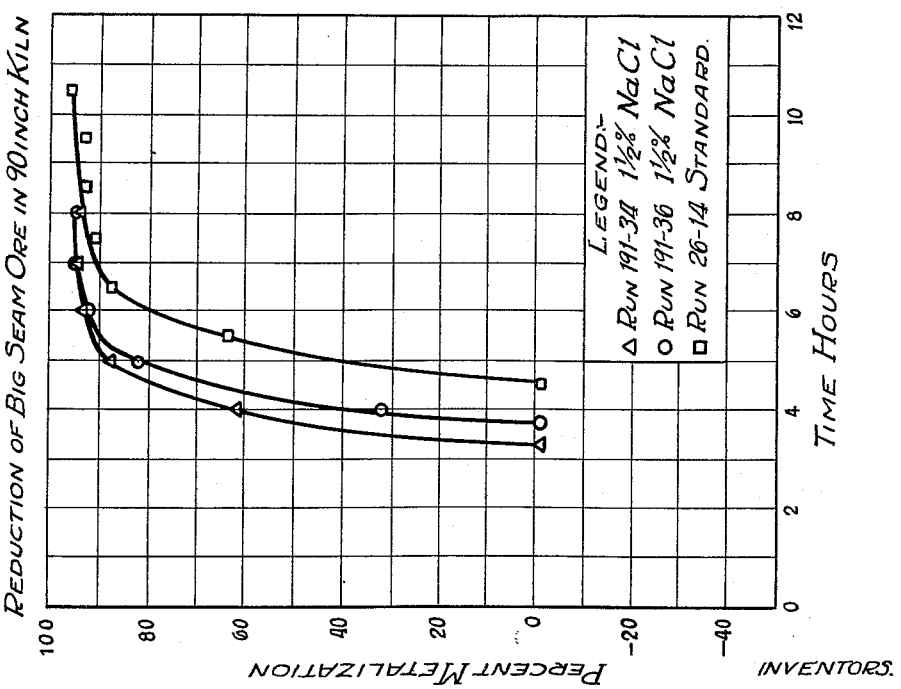
INVENTORS.
GEORGE G. REED JR.
EUGENE J. BEER.
BY
*Ward, Neal, Haselton, Orme & McChannon*
ATTORNEYS.

George G. Reed, Jr., and Eugene J. Beer, Mountain Lakes, N.J., assignors to R-N Corporation, New York, N.Y., a corporation of Delaware
Filed Dec. 27, 1960, Ser. No. 78,522
5 Claims. (Cl. 75—33)

This invention pertains to the production in high yield, of metallic iron from non-titaniferous iron ores and other iron oxide bearing materials, by direct reduction in admixture with a solid, carbonaceous reducing agent, and at temperatures below those productive of fusion or sintering, and in general below 2000° F.

Although not limited thereto, the invention is particularly adapted to the efficient recovery of metallic iron from relatively low grade ores, such as Alabama "Big Seam," Conakry "A," etc., as exemplified below, which are poorly suited in their native state, as mined, to blast furnace reduction, but which can be reduced on a commercially acceptable basis in a rotary kiln, a most efficient construction and operation of which is described in U.S. Patent 2,829,042 to Moklebust, incorporated by reference herein.

In such reduction as described in said patent, crushed ore and a carbonaceous reducing agent, such as coke, together with lime where required, are fed progressively into the kiln, the atmospheric and temperature conditions of which are precisely controlled throughout by means of spaced air inlets, and the delivered product from which is cooled and the metallic iron constituent recovered by conventional separating and concentrating techniques as outlined below.

For a minimum retention time in the heated zone of the reduction kiln, the extent of metallic iron recovery increases with the temperature of the ore-coke bed in the kiln up to the temperature of metal fusion or sintering, but if carried to that temperature level, as pointed out in said patent, there results a plastic agglomeration of the tumbled bed mass resulting in adherence to the kiln wall in massive form, termed "ringing" requiring frequent shut-downs for cleaning and repairs.

Thus for maintaining continuity of operation over prolonged periods, the bed temperature must be maintained below that resulting in such fusion and adherence of the charge to the kiln wall, and also below that productive of "clinkering," i.e., the agglomeration of large masses of the charge such as would obstruct the furnace exit.

On the other hand, since as above stated the extent or percent of metallization of the charge increases with temperature up to the fusion or sintering temperature, there results a decrease in yield of the metallic iron as the operating temperature is dropped progressively below that level, other conditions remaining the same.

Accordingly, any method or means which increases the percent of metallization of the ore at temperatures below the fusion or sintering level, is of vital importance in improving the efficiency of kiln operation and reductions therein.

Now we have discovered in accordance with our invention, an extremely inexpensive and simple expedient for so doing, which consists in the addition to the ore of a relatively small amount of common salt, i.e., sodium chloride or equivalent thereof as discussed below. We find, as demonstrated by the test results hereinafter set forth, that with the addition of salt in amount of about 0.5 to 5%, and preferably about 1 to 2.5% by weight of the dry ore constituent, there results: an increased metallization of the ore during reduction, a highly metallized final concentrate with higher total iron content together with a lower gangue content and higher iron recovery than otherwise, in addition to which the separation and concentration of the iron values is greatly facilitated. Also the iron recovery in high yield occurs at lower temperatures and in shorter times than otherwise, such that efficient reduction is obtained well below the sintering or fusion temperature, and massive adherence to or "ringing" of the kiln wall thereby avoided.

As applied to most non-titaniferous iron ores, i.e., those containing no substantial amount of titanium dioxide in combination with iron oxide as $FeO \cdot TiO_2$, we have found that the salt addition tends to lower the reduction temperature at which metallization in high yield occurs, to well under 2000° F. and to that on the order of about 1850–1950° F. for the majority of such iron ores or other iron oxide bearing materials.

We have also found that the salt addition imparts a high degree of friability to non-titaniferous ores, as a result of which during the subsequent grinding and separating operations, the metallized ore breaks up more easily than when the salt is absent, particularly in the earlier stages of separation, whereby separation and concentration of the iron values are greatly facilitated. In contrast to this, we have found on the other hand that friability is not imparted by salt additions to titaniferous ores, so that the advantages of the present invention are not obtained as applied thereto.

Our investigations have further shown, as demonstrated below, that salt additions in the relatively small proportions above stated are particularly applicable to high yield reductions, conducted in general below about 2000° F., i.e., well below the sintering or fusion temperature, of the relatively soft or clay-like aluminum-containing, nonmagnetic ores, such for example as those containing about 2 to 10% aluminum (calculated as $Al_2O_3$), and also to those containing about 3 to 25% of chemically combined water. However, pre-roasting of such ores, such as would eliminate the chemically combined water, does not impair the effectiveness of the salt addition. Typical such ores are the lateritic types, the Alabama "Big Seam" and others as discussed below. The ores in which magnetite is the predominant iron mineral are not normally directly benefited by the salt or equivalent additive, but usually can be made so by conversion of the magnetite to hematite, as by roasting, etc.

The benefits of our invention are demonstrated by the test results presented below on ore reduction runs made in rotary kilns constructed and operated in accordance with the method set forth in the above Moklebust patent, using the same type of ore for each series of runs, both without and with NaCl salt and equivalent additions, and also by the test results thereafter presented based on batch type, muffle furnace reductions.

As regards the rotary kiln test results first presented, the general procedure employed in running these tests was as follows: The ore, crushed to a desired particle size, and intimately admixed with the salt additive or sprayed with an aqueous salt solution if the particular run is to include this addition agent, is fed into the kiln along with crushed coke and, in some instances with lime, depending on the ore used, and the resulting mass fed progressively through the rotary kiln, the temperature and gaseous atmosphere of which is controlled throughout as set forth in said patent. The reduced ore product as delivered from the exit end of the kiln, is then cooled, as by quenching in water. The excess reducing agent is separated out, as by screening, tabling and/or magnetic separation. The remaining magnetic material is then comminuted, usually by ball-mill grinding, and the comminuted material is then subjected to a magnetic or other separation based on the physical characteristics of the material. Several stages of grinding, usually four or five in the tests presented below, and magnetic separation are employed. The final metallic iron concentrate, in the form of a finely comminuted particle slurry, is de-watered, and pressed into briquettes under pressure.

It has been found that when the salt addition process of the present invention is used, a much larger proportion of the material will, owing to its friability, be ground to −200 mesh in particle size for a predetermined amount of grinding, than when the same starting material is carried through the identical process, but without the use of the salt addition.

The final briquetted metallic product provides an excellent feed material for open hearth or electric furnace melting, so that the process of the invention in effect permits of bypassing the blast furnace stage of the conventional, integrated steel mill operations.

A series of tests run in the manner aforesaid were made on Big Seam ore of the following typical analysis:

| | Percent |
|---|---|
| Total Fe | 34.6 |
| $SiO_2$ | 27.5 |
| $Al_2O_3$ | 3.0 |
| CaO | 8.7 |
| MgO | 1.2 |
| P | 0.4 |
| Mn | 0.1 |
| S | 0.01 |
| C | 2.8 |

The results of a first series of runs made are presented in Table I below employing Big Seam ore with no salt addition in one run, designated 27–84, and with a 1% NaCl salt addition in the remaining two runs shown in the table, and designated 27–86 and 27–92.

TABLE I
*Concentration Data—Big Seam Ore*

| Run number | 27–84 | 27–86 | 27–92 |
|---|---|---|---|
| Reduction conditions: | | | |
| Temperature (° F.) | 1,850 | 1,850 | 1,855 |
| Time (hrs.) | 7.0 | 7.3 | 7.5 |
| Quench temperature (° F.) | 1,100 | 1,100 | 1,100 |
| Additive | None | 1% NaCl | 1% NaCl |
| Metallization (percent) | 91.6 | 95.5 | 90.4 |
| Grinding cycle (hrs.) | 1, 1, 2, 2 | 1, 1, 2, 2 | 1, 1, 2, 2 |
| Jeffrey final concentration: | | | |
| Percent total iron | 90.0 | 92.6 | 93.2 |
| Percent metallic iron | 86.2 | 90.5 | 90.5 |
| Percent metallization | 95.8 | 98.1 | 97.1 |
| Percent calculated gangue | 8.9 | 6.0 | 6.0 |
| Percent $SiO_2$ | 2.96 | 2.0 | 2.4 |
| Percent total carbon | 0.51 | 0.12 | 0.16 |
| Percent cumulative Fe recovery [1] | 93.0 | 92.2 | 92.5 |
| Green density [2] | 4.52 | 4.87 | 4.73 |
| Green strength [2] | 1,185.0 | 2,500.0 | 1,550.0 |
| Percent −325 mesh | 73.76 | 81.36 | 70.36 |

[1] Davis tube recovery data.
[2] As briquetted.

It will be noted that in the above tests, all runs were made at 1850° F. maximum bed temperature. All of the runs were stage ground and concentrated. The grinding intervals were one hour, one hour, two hours, and two hours, for a total of six hours. Concentration followed each grinding stage. The NaCl was added to run 27–86 by first drying the ore and then wetting it with sufficient aqueous salt solution to give 1% NaCl in the ore. The salt was added to run 27–92, by pelletizing the −6 mesh ore fraction with 1% NaCl, adding 1% NaCl to the +6 mesh fraction by spraying with salt solution, and then mixing the two fractions.

From the above data it will be seen that the 1% salt addition resulted in an increase of over 4% of metallic iron, containing substantially less of impurities than resulted from omission of the salt, the gangue, $SiO_2$ and carbon being less in each instance for the salt treated material. Also the "green" tensile strength of the briquetted final product was substantially higher for the metallic iron derived from the salt treated ore. This also evidences the higher purity of the salt treated ore.

The following Table II gives the results of a further series of runs made at 1970° F. maximum bed temperature, with Big Seam ore but with a 1.5% NaCl salt addition for the runs designated 205–79, 191–36 and 191–34, versus no salt addition for runs 191–21 and 158–9. The ore was prepared by crushing to −½ inch and fed to a pelletizing disc, wherein the fines were pelletized into ⅛ inch pellets. During the pelletizing of the material for the salt addition runs, the material was sprayed with an aqueous salt solution to give 1.5% salt in the ore.

TABLE II
*Concentration Data—Big Seam Ore*

| Run number | 205–79 | 191–34 | 191–36 | 191–21 | 158–9 |
|---|---|---|---|---|---|
| Additive, percent | 1.5 NaCl | 1.5 NaCl | 1.5 NaCl | None | None |
| Grinding Cycle, hrs | 1, 1, 2, 2 | ½, ½, 2, 2 | ½, ½, 2, 2 | 1, 1, 2, 2 | 1, 1, 2, 2 |
| Feed: | | | | | |
| Percent total iron | 42.35 | 44.02 | 47.07 | 54.3 | 47.4 |
| Percent metallic iron | 39.16 | 40.91 | 44.15 | 48.2 | 43.6 |
| Percent metallization | 92.5 | 92.9 | 93.8 | 88.8 | 92.1 |
| Percent calculated gangue | 56.7 | 55.2 | 52.1 | 44.0 | 51.5 |
| Jeffrey final concentrate: | | | | | |
| Percent total iron | 94.15 | 93.72 | 94.00 | 93.1 | 91.9 |
| Percent metallic iron | 91.36 | 91.09 | 91.64 | 90.8 | 88.0 |
| Percent metallization | 97.0 | 97.2 | 97.5 | 97.5 | 95.7 |
| Percent calculated gangue | 5.1 | 5.5 | 5.3 | 6.2 | 7.0 |
| Percent silica | 2.19 | 2.36 | 2.32 | 2.27 | 2.6 |
| Percent total carbon | 0.45 | 0.25 | 0.36 | 0.08 | 0.62 |
| Percent sulfur | 0.03 | 0.03 | 0.02 | 0.04 | |
| Percent $H_2$ loss | 1.54 | 1.32 | 0.98 | 1.77 | 1.80 |
| Percent cumulative Fe recovery | 93.9 | 93.9 | 93.2 | 89.0 | 86.9 |
| Percent −325 mesh | 85.68 | 80.74 | 79.00 | 64.32 | 88.04 |
| Green density | 4.77 | 4.94 | 4.87 | 4.91 | 4.28 |
| Green strength | 742 | 1,271 | 1,263 | 1,286 | 100 |
| Davis tube final concentrate: | | | | | |
| Percent total iron | 94.03 | 94.47 | 94.50 | 94.0 | 92.7 |
| Percent metallic iron | 91.92 | 92.25 | 92.27 | 91.1 | 89.4 |
| Percent metallization | 96.9 | 97.7 | 97.7 | 97.0 | 96.4 |
| Percent calculated gangue | 4.3 | 4.9 | 4.9 | 5.2 | 6.4 |
| Percent cumulative Fe recovery | 94.7 | 93.4 | 95.5 | 89.0 | 95.0 |

NOTE—Maximum kiln temperature 1,970° F. in all runs.

In the Table II as in the Table I tests, the percent metallic iron recovery is substantially higher for the salt treated ores, and also the contaminant content is lower.

Referring to the accompanying drawings, FIG. 1 shows for runs 191–34 and 191–36, the percent metallization of the ore in the rotary kiln versus time; while FIG. 2 shows the bed temperature of the ore-coke charge in the kiln versus time for these runs. FIG. 1 also includes for comparison, the percent metallization versus time for a run designated 26–14, made under the same conditions except for omission of the salt addition.

As indicated in FIG. 1, the salt addition had no effect on the reduction rate of the ore during the major portion of the reduction in the rotary kiln. The periods of time necessary to start the reaction for the several runs were different due to different methods of preheating the ore to the reaction temperature for the several runs. However, these graphs do establish that the salt addition is an aid during the later stages of reduction when diffusion in the semi-reduced ore governs the rate of reaction; that is to say, from about 85% metallization until the completion of the runs, because at this stage the salt addition results in a high degree of metallization without extending the time of reduction. For example, starting at the 85% metallization level, it will be seen that only 3 hours were required to complete the reduction for the salt-bearing ores, whereas about 4 hours were required in the case of the untreated ore.

Referring to FIG. 2, it will be seen that the salt addition has the further merit in that it lowers the temperature of most effective reduction. For the runs containing salt, the major portion of the reduction of from 0 to 85% is accomplished in the temperature range of 1710–1770° F.; whereas for the run containing no salt, it is accomplished at 1800° F. Considering the nature of the Big Seam ore on which these tests were run and its tendency to fuse and form fayalite, any method which lowers the reduction temperature while the kiln bed is in the FeO state, obviously has merit.

From the test results above presented and discussed, it will be seen that when comparing the runs made with and without the salt addition, the following benefits of the salt addition are established: (1) a high metallization of the feed to the grinding circuit which results in greater cumulative iron recovery; (2) a highly metallized final concentrate at a high iron recovery; (3) a calcualted gangue content of the final concentrate 1 to 2% lower; (4) a greater total iron content in the final concentrate; and (5) a lower effective reduction temperature.

It appears that the total carbon content of the final concentrate is not affected by the addition of salt. This is primarily a function of the nature of the gases in the kiln. For example, run 191–21 of Table II, was deliberately run with a greater than normal oxidizing temperature of the charge. This resulted in an 0.08% total carbon content.

The following Table III gives the results of a further series of rotary kiln runs made on an ore known as "Conakry A" which is a lateritic ore of typical analysis as shown in the table and containing about 2% of chromic oxide $Cr_2O_3$. The runs were made at maximum bed temperature just under 2000° F. both with and without NaCl salt additions of 2.5% by weight of the dry ore. The ore was prepared by crushing to —½″ and the salt was added to the ore in trucks before loading into the ore bins supplying the rotary kiln, with average results as set forth in the table for no salt addition versus with the salt addition.

TABLE III

| Constituent, percent | Ore feed | Final concentrate | |
|---|---|---|---|
| | | 2.5% salt additive | No salt additive |
| Total iron | 43.3 | 91.23 | 81.10 |
| Metallic iron | | 85.27 | 73.09 |
| $SiO_2$ | 1.2 | 0.39 | 1.26 |
| $Al_2O_3$ | 11.0 | 3.99 | 10.07 |
| $Cr_2O_3$ | 1.9 | 1.00 | 1.81 |
| Sulfur | 0.1 | 0.15 | 0.026 |
| Phosphorus | 0.1 | 0.04 | 0.04 |
| Nickel | 0.15 | 0.18 | 0.19 |

Referring to the above data it will be noted that the total iron in the final concentrate was increased by more than 10% from 81.1% with no salt addition to 91.23% with the salt additive, and the metallic iron content was correspondingly increased to an even greater extend from 73.09% to 85.27%. In addition, the salt additive greatly reduced the chromic oxide content in the final concentrate to about one-half that of the ore feed, whereas with the salt omitted, the reduction of $Cr_2O_3$ in the final concentrate versus that in the ore feed was substantially nil.

As above stated, in the tests summarized in Table III, the salt was added to the ore in trucks and dumped into the kiln feed bins, which afforded relatively poor admixing. Further tests, however, have established that an intimate admixture of the salt and ore is required for most effective results, such as by tumbling the salt with the ore, or by admixing and balling, or by spraying the ore with an aqueous salt solution. Intimate admixing is further facilitated by the degree of fineness to which the ore is crushed. These effects are shown by a further run made in the rotary kiln with the above ore crushed to —6 mesh and balled with 2.7% of sodium chloride salt. The final concentrate in the run contained 87.44% total iron and only 0.75% $Cr_2O_3$. Additional tests showing the effect of intimately interspersing the ore with the salt, and also crushing the ore to small mesh, are given in the following Table IV in which the reductions were conducted in a muffle furnace followed by separation and concentration in the manner above outlined. Also shown in the table is the effect of varying the salt addition from 0.5 to 5% as compared to the no salt addition, and also the effect of changing the reduction temperature from the optimum value of 1000° C. (1830° F.) to 1050° C. (1920° F.).

From the data in Table IV it will be seen that the thorough admixture of the salt and ore in reductions conducted at 1000° C. (1830° F.) and with additions of 1–5%, resulted in a final or fifth stage metallic iron recovery on the order of 94–96%, a total iron recovery on the order of 95–97%, and a maximum $Cr_2O_3$ content of less than 0.4%. The data also shows that for minimizing the $Cr_2O_3$ content in the final concentrate, the reduction temperature plays an important role as seen by comparison of the 1% salt addition tests at 1000° C. and 1050° C., respectively, for —½% ore size. In the 1000° C. test the chromic oxide content of the final concentrate was 0.6% as compared to 1.06% for the test at 1050° C. It will further be seen that the salt addition is effective over the range of about 1 to 5%, about 2.5% being most effective with little gain for higher additions. Also as shown by the data for the 1% and 2.5% salt additions to —½″ ore and that crushed to —150 mesh, the recovery of iron values is increased for the finer mesh which affords more intimate admixture of the iron and ore particles. For salt additions of about 1 to 5% the metallic iron recoveries are about 3 to 4% higher, and the total iron recoveries about 0.5 to 3.5% higher, than when no salt is added. In addition, the $Cr_2O_3$ content was reduced below 0.4% with salt additions of 1–5% or more as compared to 0.64% without the salt additive.

Also referring to the data for the first grinding stage,

TABLE IV

| Reduction conditions: | | | | | | | | |
|---|---|---|---|---|---|---|---|---|
| Additive | | 0.5% NaCl | 1% NaCl | 1% NaCl | 2.5% NaCl | 2.5% NaCl | 5% NaCl | 1% NaCl |
| Method of adding | | Spray | Tumbling | Balling | Tumbling | Balling | Tumbling | Tumbling |
| Ore size | -½" | -½" | -½" | 90%-150 mesh | -½" | 90%-150 mesh | -½" | -½" |
| Time at temp., hours | 9 | 6 | 5 | 6 | 6 | 6 | 6 | 5 |
| Temp., °C | 1,000 | 1,000 | 1,000 | 1,000 | 1,000 | 1,000 | 1,000 | 1,050 |
| Feed to concentration: | | | | | | | | |
| Total Fe, percent | 76.8 | 75.4 | 74.2 | 74.4 | 75.3 | 70.7 | 76.5 | 70.1 |
| Metallization | 91.5 | 89.5 | 93.0 | 93.5 | 95.0 | 94.2 | 94.1 | 92.0 |
| Calculated gangue | 21.3 | 22.3 | 24.3 | 24.2 | 23.6 | 28.1 | 22.2 | 28.3 |
| Relative weight | 100.0 | 100.0 | 100.0 | 100.0 | 100.0 | 100.0 | 100.0 | 100.0 |
| Fe recovery | 100.0 | 100.0 | 100.0 | 100.0 | 100.0 | 100.0 | 100.0 | 100.0 |
| $Cr_2O_3$ | 2.18 | 2.26 | 2.17 | | 2.44 | | 2.08 | 2.75 |
| 1st stage concentrate ½ hr. cum. grinding: | | | | | | | | |
| Total Fe, percent | 88.8 | 83.5 | 87.3 | 88.0 | 87.8 | 88.5 | 90.1 | 82.5 |
| Metallization | 93.1 | 90.5 | 94.3 | 94.9 | 95.9 | 95.8 | 95.7 | 93.1 |
| Calculated gangue | 14.5 | 14.2 | 11.3 | 10.7 | 11.2 | 10.4 | 8.8 | 15.9 |
| Relative weight | 89.1 | 88.5 | 83.3 | 83.1 | 84.2 | 78.1 | 83.3 | 83.3 |
| Fe recovery | 97.2 | 98.0 | 97.0 | 98.3 | 98.1 | 97.8 | 98.1 | 98.1 |
| $Cr_2O_3$ | 2.08 | 1.85 | 1.63 | | 1.27 | | 0.95 | 2.44 |
| Minus 200 mesh | 43.1 | 74.1 | 78.2 | 96.6 | 86.9 | 99.4 | 57.8 | 44.0 |
| 5th stage concentrate 6 hrs. cum. grinding: | | | | | | | | |
| Total Fe, percent | 93.0 | 92.0 | 93.5 | 95.1 | 95.4 | 96.5 | 96.0 | 91.3 |
| Metallization | 96.0 | 93.5 | 95.7 | 96.0 | 97.9 | 97.1 | 96.8 | 95.0 |
| Calculated gangue | 5.9 | 6.3 | 5.4 | 3.8 | 4.0 | 2.7 | 3.1 | 7.4 |
| Relative weight | 76.0 | 74.9 | 75.5 | 75.0 | 74.3 | 69.8 | 76.6 | 72.3 |
| Fe recovery | 92.0 | 91.4 | 95.2 | 95.9 | 94.0 | 95.3 | 96.1 | 94.1 |
| $Cr_2O_3$ | 0.64 | 0.85 | 0.60 | 0.34 | 0.36 | 0.32 | 0.26 | 1.06 |
| Minus 200 mesh | 99.4 | 100.0 | 100.0 | 100.0 | 100.0 | 100.0 | 100.0 | 99.8 |
| Minus 325 mesh | 94.4 | 99.8 | 95.8 | 96.5 | 98.4 | 99.5 | 98.6 | 95.5 | the friability imparted to the ore by the salt additions as compared to its omission, is clearly demonstrated by the fraction of −200 mesh in each instance, ranging from about 58 to 87% for the salt treated ore of initially −½" mesh as compared to only 43% for the same ore untreated. The greater ease with which the salt treated ore thus breaks up results in a higher rate of separation as shown by comparison of the iron recovery values with those of the untreated ore.

In all of the test results above presented and discussed, the ore additive was the sodium chloride salt. The data set forth in the following Table V establishes, however, that other sodium and potassium compounds may be substituted. The tests presented in the table were conducted in the same manner as those above discussed with reference to Table IV.

high combined water and a low aluminum content, and the following composition:

| | Percent |
|---|---|
| Total iron | 35.2 |
| Including bivalent iron (calculated as FeO) | 10.2 |
| $SiO_2$ | 5.5 |
| Al (calculated as $Al_2O_3$) | 2.6 |
| Ca (calculated as CaO) | 11.0 |
| Mg (calculated as MgO) | 1.2 |
| Carbon (calculated as $CO_2$) | 6.9 |
| Ti (calculated as $TiO_2$) | 0.3 |
| Ignition loss (corresponding to chemically combined water) | 24.0 |

The ore was used in the form of −½" particles and reduction carried out batch-wise in a muffle furnace with subsequent separation and concentration in the manner

TABLE V

*Concentration of Conakry A Ore Metallized With Various Additives*

| | 1 | 2 | 3 | 4 | 5 | 6 |
|---|---|---|---|---|---|---|
| Reduction conditions: | | | | | | |
| Additive | 2.5% NaCl | 2.5% $K_2CO_3$ | 2.5% KOH | 2.5% NaOH | 2.5% KCl | 2.5% $Na_2CO_3$ |
| Method of adding | | The additives were added by tumbling in wet ore | | | | |
| Ore size, inch | -⅛ | -⅛ | -⅛ | -⅛ | -⅛ | -⅛ |
| Time at temp., hours | 6 | 7 | 7 | 7 | 7 | 6 |
| Temp., °C | 1,000 | 1,000 | 1,000 | 1,000 | 1,000 | 1,000 |
| Feed to concentration: | | | | | | |
| Total iron, percent | 73.6 | 65.4 | 63.8 | 63.8 | 64.1 | 77.9 |
| Metallization | 92.2 | 94.3 | 90.4 | 84.5 | 89.7 | 89.5 |
| Calculated gangue | 24.8 | 33.5 | 34.6 | 33.4 | 34.0 | 19.8 |
| First stage concentrate ½ hr. cum. grinding: | | | | | | |
| Total iron, percent | 90.0 | 77.4 | 77.1 | 75.4 | 89.0 | 86.1 |
| Calculated gangue | 8.9 | 21.3 | 20.8 | 22.3 | 9.8 | 11.9 |
| Minus 200 mesh | 95.1 | 66.5 | 77.4 | 80.0 | 93.7 | 64.5 |

The above data shows that the potassium chloride additive is substantially equivalent in performance to sodium chloride, on an equal weight percentage basis, with good results also being obtained with the sodium and potassium hydroxide and carbonate additives. NaCl salt is of course the preferred additive since it is cheapest and also the most effective as shown in the table. The test data establishes, however, that the beneficial results of the invention are obtained by additives selected from the group consisting of inorganic sodium and potassium salts and bases.

The following examples of salt additive, reduction tests conducted on various other types of non-titaniferous ores, demonstrates the beneficial results obtained for such ores as a class.

EXAMPLE 1

The ore used in this test was a French ore having a above set forth with reference to Table IV. The reducing time was about 4 to 4½ hours and the temperature, 1050° C. as applied to reductions with and without a 2.5% salt additive. The results of the first stage grinding were as follows:

| | Sample with salt | | Sample without salt | |
|---|---|---|---|---|
| | Magnetic concentrate materials | Non-magnetic materials | Magnetic concentrate materials | Non-magnetic materials |
| Total Fe | 77.9 | 4.8 | 72.0 | 12.6 |
| Relative weight | 67.0 | 33.0 | 80.0 | 20.0 |
| Fe recovery | 97.1 | 2.9 | 95.8 | 44.2 |
| Percent −200 mesh | 99.0 | [1] 100 | 70.0 | |

[1] About.

The magnetic fractions of each of the two samples were then reground and reseparated through four total stages, resulting in the production of a product containing (expressed as percentage of metallic iron in the magnetic iron in the magnetic concentrate) for the sample containing no salt of 81.1%, and for the sample containing salt, 93.2%. The results show that the sample containing salt was much more friable as indicated by the greatly increased proportion of −200 mesh material resulting from the first stage grinding; and further that it was possible to obtain a very much higher quality final product when using salt than without it, as applied to this ore.

EXAMPLE 2

This example illustrates the applicability of the salt additive process to the treatment of a material other than a natural ore. The material treated was a so-called "sinter mass," which was a mixture of ferruginous material having the following over-all composition:

|   | Percent |
| --- | --- |
| Total iron | 28.2 |
| Including bivalent iron (calculated as FeO) | 1.9 |
| Al (calculated as $Al_2O_3$) | 6.6 |
| $SiO_2$ | 16.2 |
| Ca (calculated as CaO) | 15.2 |
| Mg (calculated as MgO) | 1.3 |
| Carbon (calculated as $Co_2$) | 0.9 |
| Ti (calculated as $TiO_2$) | 0.9 |
| Ignition loss (corrected to chemically combined water) | 16.6 |

This material as received was 100% −½ inch in particle size. It was treated exactly as in Example 1 herein with the following specific exceptions: In this case the initial reduction time for batches without and with a 2.5% salt additive was 7 hours and the temperature 1050° C.; and in addition, the sample excluding salt was further subjected to reduction action for an additional 4 hours at 1075° C., as experience had shown that the percent metallization was relatively low otherwise. It was found that both samples of this particular material ran into clinkering troubles if an initial temperature of 1075° C. or higher was used, so that the temperatures chosen were those selected so as to avoid clinkering and the times were those necessary to insure attainment of a reasonable amount of reduction at the temperature used. After the first stage grinding for about ½ hour, the magnetic fraction resulting from the no salt-containing sample had only 64.0% of the iron therein converted to metallic iron; while the sample with salt had 72.6% so converted. After a total of four stages of grinding and magnetic separation as aforesaid, the sample with salt had 90.5% of the iron present as metallic iron; while the sample without salt had only 78.8% in metallized form.

EXAMPLE 3

The ore used in this case was a Cuban lateritic ore containing about 40–45% iron (calculated as such), 4–5% $Al_2O_3$ and about 10% chemically combined water. The iron was all in the form of $Fe_2O_3$, and was probably present as a hydrated oxide. This ore also contained a substantial amount of nickel and cobalt and was first treated for the recovery of these two elements by leaching with sulfuric acid.

In testing this material for the applicability of the present invention, a first sample was balled (it being in very fine particle form prior to this step incident to the leaching operation), then roasted at 2000° F. primarily for the removal of sulfur therefrom, as there was a substantial amount of sulfur in the material at this stage of the process; the resulting balls were then brine-soaked, to give a 1.5% NaCl content (by weight) in the balls as dried out. These balls were then reduced, and the reduced material subjected to a first stage concentration involving first a comminution operation followed by magnetic separation. The first stage concentrate showed that the total iron content of the concentrate material having no salt added was 85.7%; while that of the balls to which salt was added was 88.9%. An even greater difference was found in the case of the proportion of these concentrate materials which was −200 mesh in particle size, in that in the concentrate, material from the balls to which no salt was added, the −200 mesh material was 72.5% of the total; while the corresponding figure for the concentrate material from the balls to which salt was added as aforesaid, was 86.4%.

As a separate pair of tests, some of the original balls were roasted at 2100° F. to give a much harder and firmer type of ball and also a better sulfur removal during the roasting. Again, tests were run after reducing and magnetic separation to determine the total iron content in the first stage concentrate from the balls to which no salt was added and from the balls to which 1.5% salt was added the figures in this case being, respectively, 82.8% and 83.6%. Similar tests were made as aforesaid to determine the proportion of the concentrate materials which were −200 mesh in particle size from these high temperature roasted balls after the first stage concentration, the proportion of −200 mesh material from the concentrate having no salt being 31.9%, and that corresponding figure for the balls to which salt was added being 44.0%.

The test results demonstrate the improvements in the respects above discussed of NaCl salt additions to a large variety of iron ores and other iron oxide bearing materials, and for various percentage additions of the salt with our broad and preferred ranges above stated.

What is claimed is:

1. The method of producing metallic iron in high yield from non-titaniferous iron ores and iron oxide-bearing materials, which comprises: reducing said material at elevated temperature above 1200° F. but below that productive of sintering and plastic agglomeration, and in the presence of a solid carbonaceous reductant and about 0.5 to 5% by weight of said material of at least one alkali metal compound selected from the group consisting of hydroxides and chlorides of sodium and potassium and salts thereof which form sodium and potassium oxides on heat decomposition, said reduction providing a friable reduced ore product.

2. The method of producing metallic iron in high yield from non-titaniferous iron ores and iron oxide-bearing materials, which comprises: reducing said material at elevated temperature above 1200° F. but below that productive of sintering and plastic agglomeration, and in the presence of a solid carbonaceous reductant and about 0.5 to 5% by weight of sodium chloride, said reduction providing a friable reduced ore product.

3. The method of producing metallic iron in high yield from non-titaniferous iron ores and iron oxide-bearing materials, which comprises: reducing said material at elevated temperature above 1200° F. but below that productive of sintering and plastic agglomeration, in the absence of acid halides in effective amounts and in the presence of a solid carbonaceous reductant and about 0.5 to 5% by weight of said material of at least one alkali metal compound selected from the group consisting of hydroxides and chlorides of sodium and potassium and salts thereof which form sodium and potassium oxides on heat decomposition, said reduction providing a friable reduced ore product.

4. The method of producing metallic iron in high yield from non-titaniferous iron ores and iron oxide-bearing materials, which comprises: reducing said material at elevated temperature above 1200° F. but below that productive of sintering and plastic agglomeration, in the absence of acid halides in effective amounts and in the presence of a solid carbonaceous reductant and about 0.5 to 5% by weight of sodium chloride, said reduction providing a friable reduced ore product.

5. The method of producing metallic iron in high yield from non-titaniferous iron ores and iron oxide-bearing materials, containing magnetite as the predominant iron mineral, which comprises: pretreating said material to convert the magnetite present into hematite, and reducing said material at elevated temperature above 1200° F. but below that productive of sintering and plastic agglomeration, in the presence of a solid carbonaceous reductant and about 0.5 to 5% by weight of said material of at least one alkali metal compound selected from the group consisting of hydroxides and chlorides of sodium and potassium and salts thereof which form sodium and potassium oxides on heat decomposition, said reduction providing a friable reduced ore product.

References Cited in the file of this patent

UNITED STATES PATENTS

| | | |
|---|---|---|
| 1,858,274 | Kern et al. | May 17, 1932 |
| 2,282,124 | Fahrenwald | May 5, 1942 |
| 2,523,138 | Oppegaard | Sept. 19, 1950 |
| 2,716,601 | Crowley | Aug. 30, 1955 |
| 2,829,042 | Moklebust | Apr. 1, 1958 |
| 2,995,455 | Uemura | Aug. 8, 1961 |

FOREIGN PATENTS

| | | |
|---|---|---|
| 740,913 | Germany | May 12, 1943 |